(12) United States Patent
Lin et al.

(10) Patent No.: US 9,736,498 B2
(45) Date of Patent: Aug. 15, 2017

(54) METHOD AND APPARATUS OF DISPARITY VECTOR DERIVATION AND INTER-VIEW MOTION VECTOR PREDICTION FOR 3D VIDEO CODING

(71) Applicant: MediaTek Inc., Hsin-Chu (TW)

(72) Inventors: Jian-Liang Lin, Su'ao Township Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/433,318

(22) PCT Filed: Sep. 25, 2013

(86) PCT No.: PCT/CN2013/084206
§ 371 (c)(1),
(2) Date: Apr. 2, 2015

(87) PCT Pub. No.: WO2014/053090
PCT Pub. Date: Apr. 10, 2014

(65) Prior Publication Data
US 2015/0264397 A1    Sep. 17, 2015

Related U.S. Application Data

(60) Provisional application No. 61/749,458, filed on Jan. 7, 2013, provisional application No. 61/744,887, filed on Oct. 3, 2012.

(51) Int. Cl.
*H04N 19/597* (2014.01)
*H04N 19/52* (2014.01)
(Continued)

(52) U.S. Cl.
CPC ....... *H04N 19/597* (2014.11); *H04N 13/0048* (2013.01); *H04N 19/176* (2014.11); *H04N 19/52* (2014.11); *H04N 19/573* (2014.11)

(58) Field of Classification Search
CPC .................................................... H04N 19/597
(Continued)

(56) References Cited

U.S. PATENT DOCUMENTS 8,823,821 B2 * 9/2014 Tian ....................... H04N 7/181
                                                            348/218.1
9,204,163 B2 * 12/2015 Kim ....................... H04N 19/56
(Continued)

FOREIGN PATENT DOCUMENTS

CN          101621683          1/2010
CN          101600108          2/2011
(Continued)

OTHER PUBLICATIONS

View Synthesis for Multiview Video Compression; Martimian; 2006.*
(Continued)

*Primary Examiner* — William C Vaughn, Jr.
*Assistant Examiner* — Luis Perez Fuentes
(74) *Attorney, Agent, or Firm* — McClure, Qualey & Rodack, LLP

(57) ABSTRACT

A method and apparatus for three-dimensional video coding and multi-view video coding are disclosed. Embodiments according to the present invention derive a unified disparity vector (DV) based on neighboring blocks of the current block or depth information associated with the current block and locate a single corresponding block in a reference view according to the unified DV. An inter-view motion vector prediction (MVP) candidate is then derived for both list0 and list1 from the single corresponding block. List0 and list1 MVs of the inter-view MVP candidate are derived from the single corresponding block located according to the unified DV.

14 Claims, 7 Drawing Sheets

(51) Int. Cl.
H04N 19/573 (2014.01)
H04N 19/176 (2014.01)
H04N 13/00 (2006.01)

(58) Field of Classification Search
USPC .................................................... 375/240.16
See application file for complete search history.

(56) References Cited

U.S. PATENT DOCUMENTS

| | | | | |
|---|---|---|---|---|
| 9,237,345 B2* | 1/2016 | Kang | ............... | H04N 19/597 |
| 2010/0266042 A1* | 10/2010 | Koo | ............... | H04N 19/597 |
| | | | | 375/240.16 |
| 2014/0341291 A1* | 11/2014 | Schwarz | ............... | H04N 19/597 |
| | | | | 375/240.16 |
| 2015/0201216 A1* | 7/2015 | Lin | ............... | H04N 19/597 |
| | | | | 348/42 |
| 2015/0208086 A1* | 7/2015 | Chen | ............... | H04N 19/597 |
| | | | | 375/240.17 |
| 2015/0264397 A1* | 9/2015 | Lin | ............... | H04N 19/597 |
| | | | | 375/240.16 |
| 2016/0073132 A1* | 3/2016 | Zhang | ............... | H04N 19/597 |
| | | | | 375/240.12 |
| 2016/0112721 A1* | 4/2016 | An | ............... | H04N 19/597 |
| | | | | 348/44 |

FOREIGN PATENT DOCUMENTS

| | | |
|---|---|---|
| CN | 102227132 | 10/2011 |
| EP | 2 387 244 | 11/2011 |
| WO | WO 2012/073481 | 6/2012 |

OTHER PUBLICATIONS

Depth-based Coding of MVD Data for 3D Video Extension of H.264 AVC; Rusanovskyy, 2013.*
Analysis of motion vector predictor in multiview video coding system; May 2011; Seungchul et al.*
Overview of the Stereo and Multiview Video coding Extensions of the H.264-MPEG-4 AVC Standard; Apr. 2011.*
View scalable multiview video coding using 3-D warping with depth map; Shimizu; Nov. 2007.*
Analysis of Motion Vector Predictor in Multiview Video Coding System; Seungchul; May 2011.*
International Search Report dated Jan. 2, 2014, issued in PCT/CN2013/084206.
Hannuksela, M., et al.; "3D-AVC Test Model 3;" Joint Collaborative Team on 3D Video Coding Extension Development of ITU-T SG 16 WP 3 and ISO/IEC JTC 1/SC 29/WG 11; Jul. 2012; pp. 1-26.

* cited by examiner

METHOD AND APPARATUS OF DISPARITY VECTOR DERIVATION AND INTER-VIEW MOTION VECTOR PREDICTION FOR 3D VIDEO CODING

CROSS REFERENCE TO RELATED APPLICATIONS

The present invention is a National Stage Application of PCT/CN2013/084206, filed on Sep. 25, 2013, which claims priority to U.S. Provisional Patent Application Ser. No. 61/744,887, filed on Oct. 3, 2012, entitled "The derivation of disparity vector and interview candidate in the 3D or multi-view video coding" and U.S. Provisional Patent Application Ser. No. 61/749,458, filed on Jan. 7, 2013, entitled "Methods of simplified disparity vector derivation and inter-view motion vector prediction in 3D or multi-view video coding". The priority applications are hereby incorporated by reference in their entireties.

FIELD OF INVENTION

The present invention relates to video coding. In particular, the present invention relates to disparity vector derivation and inter-view motion vector prediction for 3D video coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras. The disparity model, such as an affine model, is used to indicate the displacement of an object in two view frames. Furthermore, motion vector for frames in one view can be derived from the motion vector for respective frames in another view.

For 3D video, besides the conventional texture data associated with multiple views, depth data is often captured or derived as well. The depth data may be captured for video associated with one view or multiple views. The depth information may also be derived from images of different views. The depth data is usually represented in lower spatial resolution than the texture data. The depth information is useful for view synthesis and inter-view prediction.

Some standard development activities for 3D video coding have been undertaken by Joint Collaborative Team on 3D Video Coding Extension Development within the international standardization organization—ITU-T. In the software test model version 5.0 of Advanced Video Coding (AVC)-based 3D video coding (3DV-ATM-5.0), an MVP candidate for Skip/Direct mode is derived based on disparity vectors (DVs) of neighboring blocks according to a predefined derivation order. When a block is coded in Direct mode, the motion information can be inferred from previously coded information without explicit signaling of the motion information. When a block is coded in Skip mode, neither the motion information nor the residual information is signaled. In this case, the residual signals are inferred as zero.

FIG. 1 illustrates an example of priority-based motion vector prediction (MVP) for Skip/Direct mode according to 3DV-ATM-5.0. A disparity vector (114) associated with the central point (112) of current block 110 (in a dependent view) is used to find a corresponding point (122) of a corresponding block (120) in the reference view (e.g., a base view). The MV (126) of the block (124) that covers the corresponding point (122) in the reference view is used as the inter-view MVP candidate of the current block. The disparity vector can be derived from the neighboring blocks and the depth value of the central point. The depth information associated with the current texture block (110) is shown in FIG. 1 as block 130 and the central point is shown as a shaded box. If any of the neighboring blocks has a DV, (e.g. $DV_A$ for block A in FIG. 1), the DV of the neighboring block is used as the disparity vector to locate the corresponding block in the reference picture. Otherwise, the converted disparity, namely the depth-based disparity is used, where the disparity is converted from the depth value of the central point and camera parameters. Compared to the approach that only uses the depth-based disparity, the approach that uses DVs from spatial neighboring blocks can reduce error propagation in case that the depth value of the central point is not available. The terms "disparity" and "disparity vector" are used interchangeably.

When the corresponding block pointed to by the DV of the neighboring block has no motion information available, the inter-view candidate will be regarded as not available and it continues to search for spatial candidate from the neighboring blocks. Alternatively, the inter-view candidate derivation process can be based on the disparity converted from the depth information of the current block. When a corresponding block pointed by the DV of the neighboring block or the DV converted from the depth information of current block is Intra-coded or uses an invalid reference picture for the current picture, the motion information of the corresponding block is considered as unavailable. The inter-view candidate and the median of three spatial candidates derived from the neighboring blocks A, B, and C (D is used only when C is unavailable) is shown in FIG. 1. On the decoder side, motion compensation is performed using the motion information of the derived MVP candidate. The motion information includes the prediction direction (uni-direction prediction or bi-direction prediction), the reference picture type (temporal prediction, virtual prediction, or inter-view prediction), and the reference picture index.

FIG. 2 illustrates an exemplary flowchart of inter-view MVP derivation according to 3DV-ATM-5.0. The input data to the priority based MVP candidate derivation process comprises motion data (210) associated with neighboring blocks A, B and C of the texture picture in a dependent view and depth data of the current block (250) in the dependent view. Any disparity information associated with a neighboring block is considered motion information for inter-view prediction. The availability of DVs associated with neighboring blocks is checked in step 220. If the DV for a neighboring block is not available, the DV is replaced by a derived disparity vector (DV) as shown in step 230, where the derived disparity vector is converted from the depth data associated with the current block. The disparity data for replacing an unavailable DV may correspond to the maximum disparity of the current block (step 260). The final disparity may be determined based on the median of the MVP candidates (i.e., the DVs associated with blocks A, B and C) as shown in step 240. After the disparity vector is derived for the current block, a block (124) covering the corresponding point (122) in the reference picture can be identified. The motion vector (126) associated with block 124 can be used as the inter-view MVP candidate.

In 3DV-ATM-5.0, list0 MV and list1 MV of the inter-view candidate are inferred independently when using the DVs of neighboring blocks to locate the corresponding point in the reference view. Specifically, the MVP for list0 is derived by first locating a corresponding block in the reference picture based on the list0 DV of neighboring blocks (if available) and then using the MV of the corresponding block as the MVP candidate for list0. Similarly, the MVP for list1 is derived by first locating a corresponding block in the reference picture based on the list1 DV of neighboring blocks (if available) and then using the MV of the corresponding block as the MVP candidate for list1. As shown in FIG. 3, for a current block (310) in a dependent view, list0 DV and list1 DV of neighboring blocks of the current block may be different and thus may locate different corresponding blocks ($C_{O1}$ and $C_{O2}$) in the reference view (e.g. base view). An exemplary flowchart associated with list0 and list1 interview candidate derivation is shown in FIG. 4. The flowchart is for list0 if ListX=list0 and the flowchart is for list1 if ListX=list1. The steps (410-460) in FIG. 4 are similar to those of FIG. 2 (210-260). However, the process is performed for list0 and list1 inter-view MVP derivation separately, where ListX corresponds to either list0 or list1. For example, in step 420, only the motion data (e.g., DV) associated with a neighboring block pointing to a reference picture in list0 is considered available if the target reference picture is in list0. The central position (472) of current block (470) can use the derived disparity vector to locate a corresponding position 482 in a corresponding block 480. The list0 motion vector associated with a block (484) covering the corresponding point (482) in the based view is used as the interview MVP candidate for the respective list.

When the inter-view MVP candidate is not available, the median of three spatial MVP candidates derived from the neighboring blocks A, B, and C is used as the MVP for Skip or Direct mode according to 3DV-ATM-5.0. The derivation procedures of Inter MVP candidate in Skip/Direct mode and inter-view MVP candidate are shown in FIG. 5A and FIG. 5B respectively. A target reference index is identified first. In 3DV-ATM-5.0, the target reference index is set to zero in Skip mode. For the Direct mode, the target reference index is derived as the minimum reference index of the neighboring blocks.

If the target reference index points to a temporal reference picture, the corresponding MVP derivation procedure is shown in FIG. 5A. The input data for the procedure comprises motion data (510) associated with neighboring blocks A, B and C of the texture picture in a dependent view and depth data of the current block (560) in the dependent view. For each neighboring block, the procedure first checks whether the neighboring block has any MV pointing to the target reference index (520A). If a neighboring block does not have an MV pointing to the target reference index, the MV for the neighboring block is replaced by a derived MV as shown in step 530A. The derived MV is obtained from a corresponding block located in the reference view according to the maximum disparity of the current block as shown in step 570A. The temporal MV (550A) is derived based on the median of the MVs associated with the neighboring blocks (540A). If none of the neighboring blocks has any MV pointing to the target reference picture and the corresponding block of the current block in the reference view does not have any MV pointing to the target reference index, a zero MV is used to represent the MV of the neighboring blocks.

If the target reference index points to an inter-view reference picture, the corresponding MVP derivation procedure is shown in FIG. 5B. For each neighboring block, the procedure first checks whether the neighboring block has a DV pointing to the target reference index as shown in step 520B. If the block doesn't have a DV, a DV converted from the depth values in the associated depth block (step 570B) is used to replace the unavailable DV of the neighboring block (step 530B). The disparity vector (550B) is derived from the median of the MVP candidates (540B) and is used to perform inter-view motion compensation.

The current practice of DV derivation to locate a corresponding block in the reference view includes two DVs pointing to reference pictures in list0 and list1 respectively. It is desirable to simplify the DV/MV derivation and to improve the coding efficiency of 3D video coding using improved DV/MV derivation.

SUMMARY OF THE INVENTION

A method and apparatus for three-dimensional video coding or multi-view video coding are disclosed. Embodiments according to the present invention derive a unified disparity vector (DV) based on neighboring blocks of the current block or depth information associated with the current block and locate a single corresponding block in a reference view (e.g. base view) according to the unified DV. An inter-view motion vector prediction (MVP) candidate list0 list1 is then derived from the single corresponding block and used for encoding or decoding of the current block. Both list0 motion vector (MV) and list1 motion vector (MV) of the inter-view MVP candidate are derived from the signal corresponding block located according to the unified DV. The neighboring blocks may comprise a left block, an upper block and an upper-right block. If the DV associated with the upper-right block is unavailable, the upper-right block is replaced by an upper-left block. The unified DV can be derived from the DVs of the neighboring blocks according to a search order from the left block to the upper block, and to the upper-right block. The unified DV can also be derived by first checking the DVs of the neighboring blocks in list0(or list1) to find an available DV. If no DV is available, the unified DV is derived by checking the DVs of the neighboring blocks in list1 (or list0) to find the available DV. If no available DV is found after checking the DVs of the neighboring blocks in both list0 and list1, a zero DV or a converted DV can be used as the unified DV. The converted DV is converted from one or more depth values associated with the current block, for example, the converted DV is the maximum of four corner depth values.

In another embodiment of the present invention, the unified DV is derived from the DVs of the neighboring blocks associated with the list0 and the list1. The DV of each neighboring block in list0(or list1) is checked first to find available DV. If no DV is available in list0(or list1), the DV of said each neighboring block in list1 (or list0) is checked to find the available DV. The available DV is designated as a selected DV of said each neighboring block. If no available DV is found for said each neighboring block after checking the DV of said each neighboring block in both list0 and list1, a zero DV or a derived DV is used as the selected DV for said each neighboring block. The derived DV is converted from one or more depth values, one or more neighboring texture or depth blocks of said each neighboring block. The unified DV can be derived based on a median, minimum, maximum, average, or a linear combination of the selected DVs of the neighboring blocks.

The unified DV can be derived by first checking the DVs of the neighboring blocks in list0 (list1) to find an available DV. If no DV is available, the unified DV is derived by checking the DVs of the neighboring blocks in list1 (list0) to find the available DV. The checking of the DVs of the neighboring blocks can be terminated whenever one available DV is found. The DV of one neighboring block is counted as unavailable if the DV does not exist, or the corresponding block located by the DV of said one neighboring block is intra-coded or not available. If no available DV is found after checking the DVs of the neighboring blocks in both the list0 and the list1, a zero DV or a converted DV is used as the unified DV, wherein the converted DV is converted from one or more depth values associated with the current block. The unified DV can be derived based on the median, minimum, maximum, average, or a linear combination of the selected DVs of the neighboring blocks. The unified DV can be derived by first checking the DVs of the neighboring blocks in list0 (list1) to find an available DV. If no DV is available, the unified DV is derived by checking the DVs of the neighboring blocks in list1 (list0) to find the available DV. The checking of the DVs of the neighboring blocks can be terminated whenever an available DV is found. The DV of a neighboring block is counted as unavailable if the DV does not exist, or the corresponding block located by the DV of said one neighboring block is intra-coded or not available. If no available DV is found after checking the DVs of the neighboring blocks in both the list0 and the list1, a zero DV or a converted DV is used as the unified DV, wherein the converted DV is converted from one or more depth values associated with the current block.

The DV is derived as the median of the DVs of neighboring blocks (A, B, C, D shown in FIG. 3; D is used when C is not available). For each neighboring block, the DV can be inferred from the list0 or list1. For example, it firstly checks the DV from list0 of a neighboring block; if that neighboring block has a DV from list0, the list0 DV is used to represent the DV of that neighboring block. If that neighboring block doesn't have a DV from list0, it then checks the DV from list1; if the neighboring block has a DV from list1, the list1 DV is used to represent the DV of that neighboring block. If that neighboring block doesn't have a DV from list0 and list1, a DV derived from depth value(s) in an associated depth block or a zero DV can be used to represent the DV of that neighboring block. Of course, in the above example, the order of list0 and list1 can be switched.

DETAILED DESCRIPTION

Figure 1:
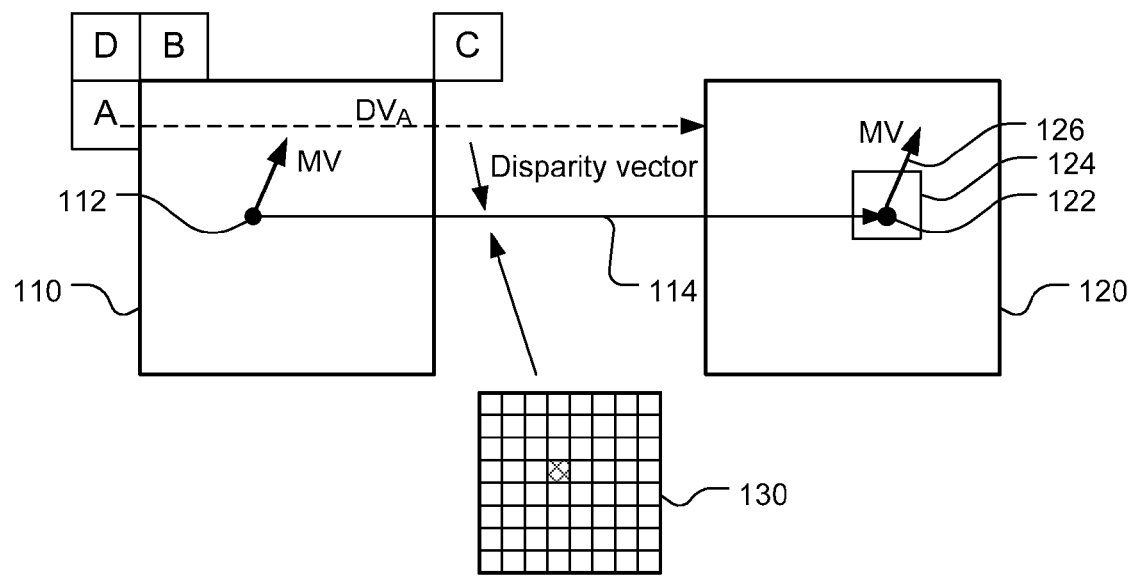
FIG. 1 illustrates an example of priority-based motion vector prediction (MVP) for Skip/Direct mode according to conventional three-dimensional video coding based on the Advanced Video Coding (AVC) standard.
Figure 2:
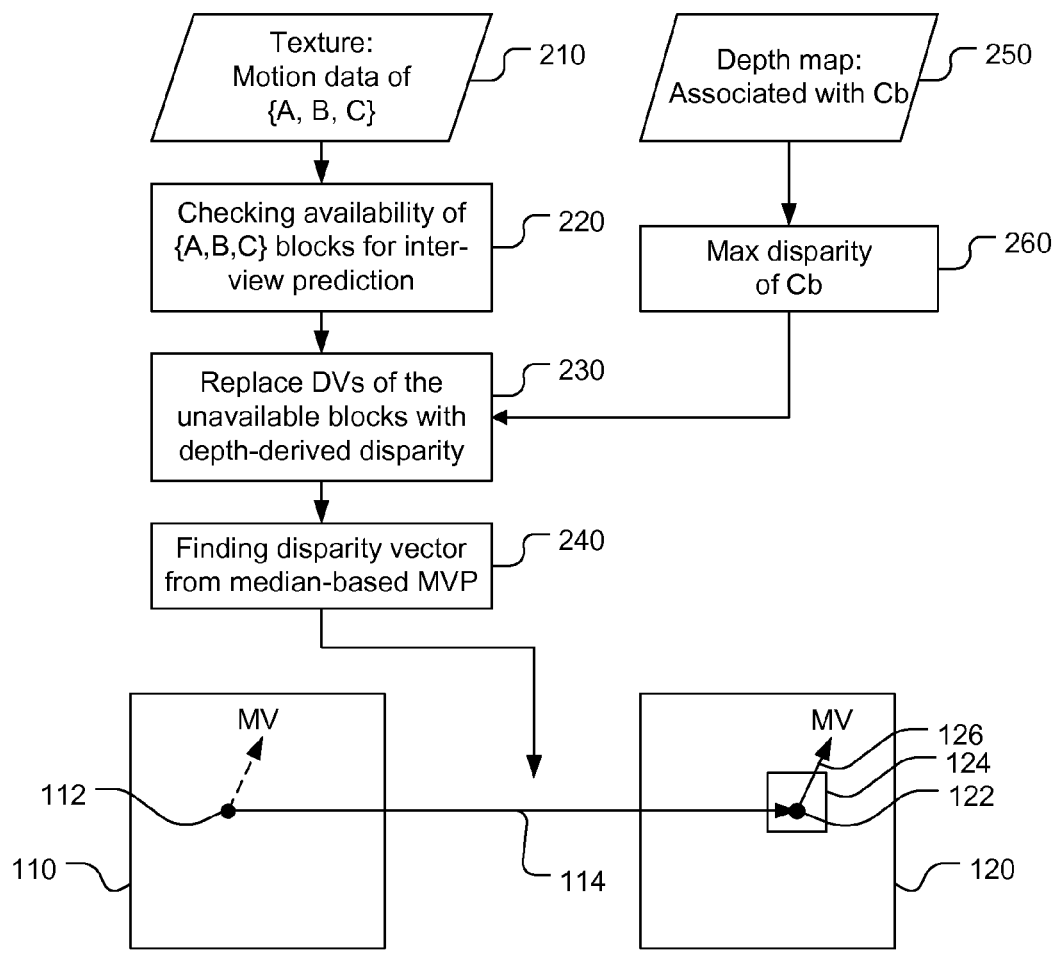
FIG. 2 illustrates an exemplary flowchart of inter-view MVP derivation according to conventional three-dimensional video coding based on the Advanced Video Coding (AVC) standard.
Figure 3:
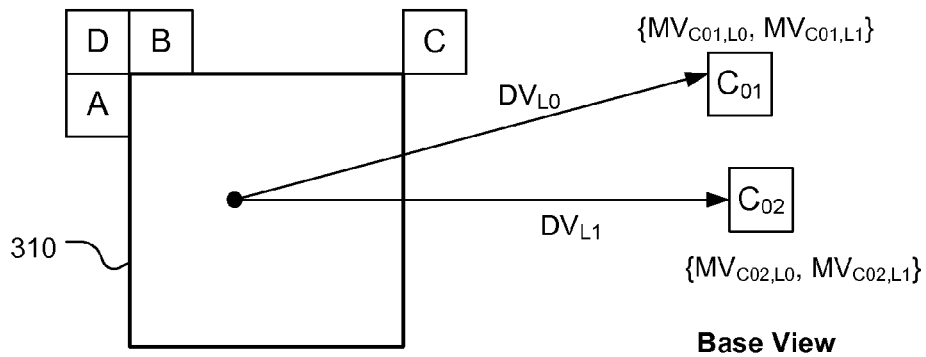
FIG. 3 shows different list0 DV and list1 DV of neighboring blocks that locates different corresponding blocks ($C_{O1}$ and $C_{O2}$) in the reference view according to conventional three-dimensional video coding based on the Advanced Video Coding (AVC) standard.
Figure 4:
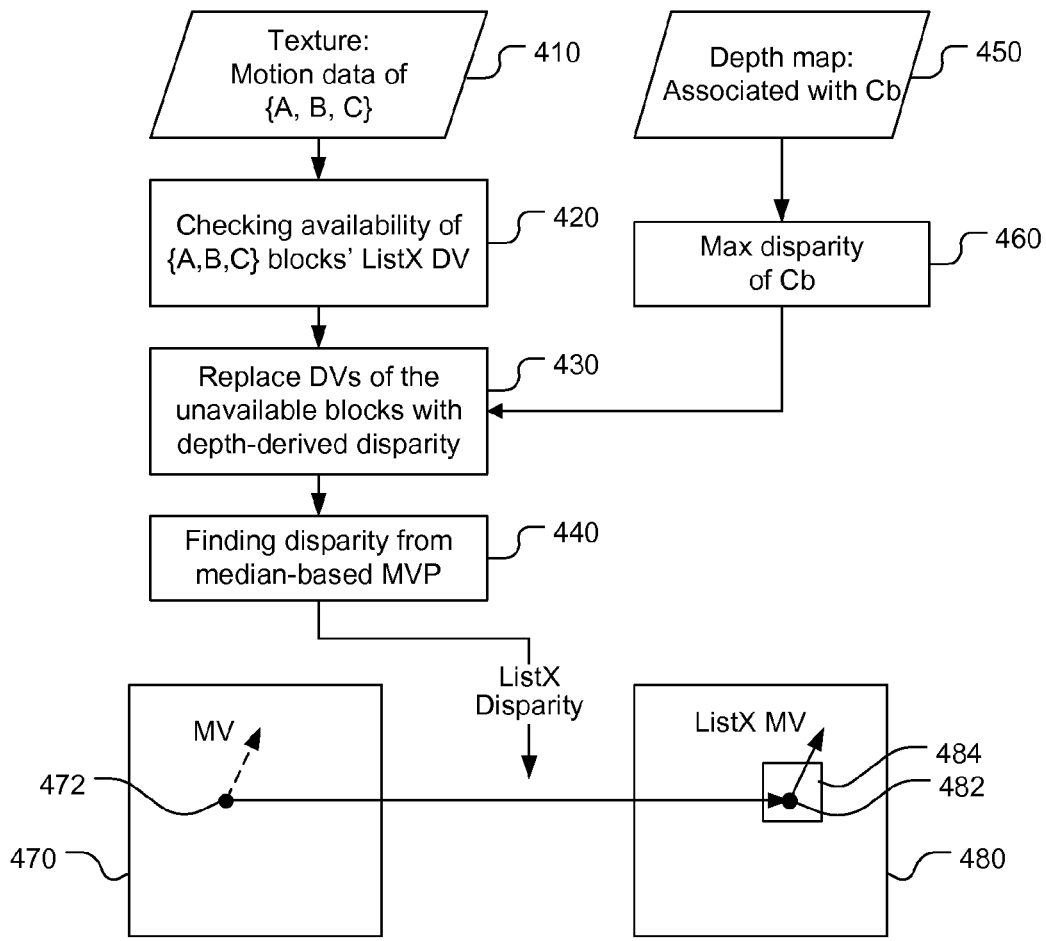
FIG. 4 illustrates an exemplary flowchart associated with list0 and list1 interview MVP candidate derivation based on different list0 DV and list1 DV of neighboring blocks, where the flowchart is for list0 if ListX=list0 and the flowchart is for list1 if ListX=list1.
Figure 5A:
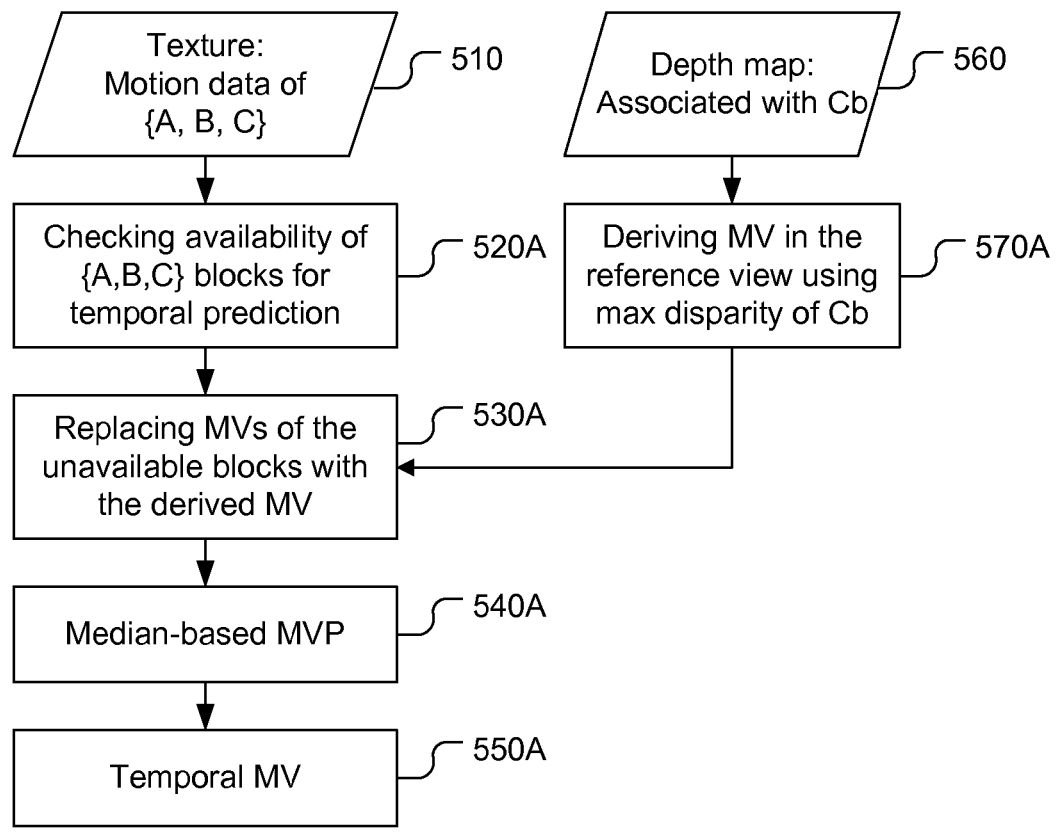
FIG. 5A illustrates an exemplary derivation procedure for temporal MVP candidate in Skip/Direct mode according to conventional three-dimensional video coding based on the Advanced Video Coding (AVC) standard.
Figure 5B:
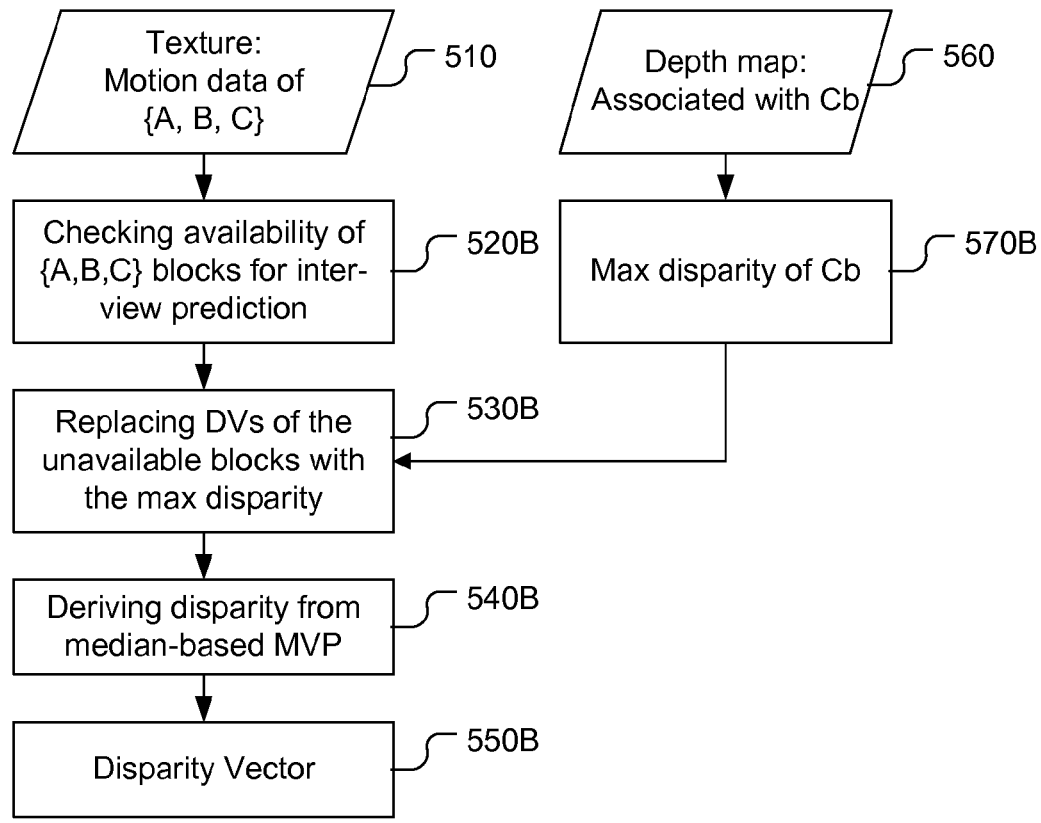
FIG. 5B illustrates an exemplary derivation procedure for inter-view MVP candidate according to conventional three-dimensional video coding based on the Advanced Video Coding (AVC) standard.
Figure 6:
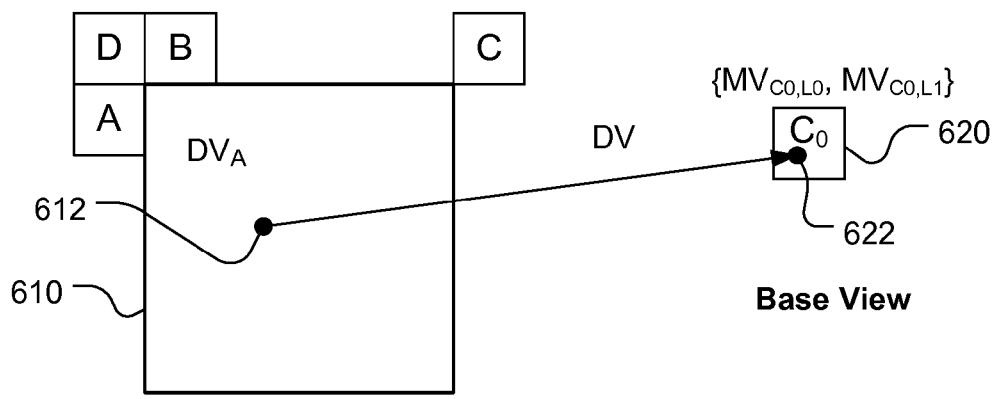
FIG. 6 illustrates an example of unified disparity vector (DV) derivation according to an embodiment of the present invention.

In the present invention, a unified disparity vector (DV) is used to infer both list0 DV and list1 DV for deriving the inter-view motion vector prediction (MVP) candidate. The unified DV can be inferred using different procedures as described below. The unified DV can be derived from the DVs of neighboring blocks of the current block as shown in FIG. 6 or the unified DV can be derived from depth information of the current block. For example, neighboring blocks A, B and C corresponding to the left neighboring block, the upper neighboring block and the upper-right neighboring block can be used to derive a DV to locate a corresponding block in the reference view. Block D corresponding to the upper-left neighboring block can be used if the DV associated with block C is unavailable.

According to one embodiment of the present invention, the unified DV derivation procedure checks the DV from list0 of each neighboring block. If the neighboring block has a DV from list0, the DV is selected to represent the DV of the neighboring block. If the neighboring block doesn't have a DV from list0, the procedure then checks the DV from list1. If the neighboring block has a DV from list1, the DV is selected to represent the DV of the neighboring block. If the neighboring block doesn't have any DV from list0 or list1, a derived or converted DV is selected to represent the DV of the neighboring block, where the converted DV is converted from depth value(s) in an associated depth block or a zero DV can be used to represent the DV of the unavailable neighboring blocks. A unified DV is derived from at least one DV of the neighboring blocks or associated depth information for both list0 and list1. For example, the unified DV is the median of the selected DVs for the three neighboring blocks, and in another example, the unified DV is derived from the maximum of four corner depth values of the associated depth block. The unified DV is then used to locate a corresponding block (620) in the reference view (base view). The unified DV points from a central position (612) of the current block (610) to a position (622) in the reference view and position 622 is covered by block 620. The motion information of block 620 in the reference view including list0 MV ($MV_{CO,L0}$) and list1 MV ($MV_{CO,L1}$) is used as the inter-view MVP candidate of the current block (610).

Figure 7:
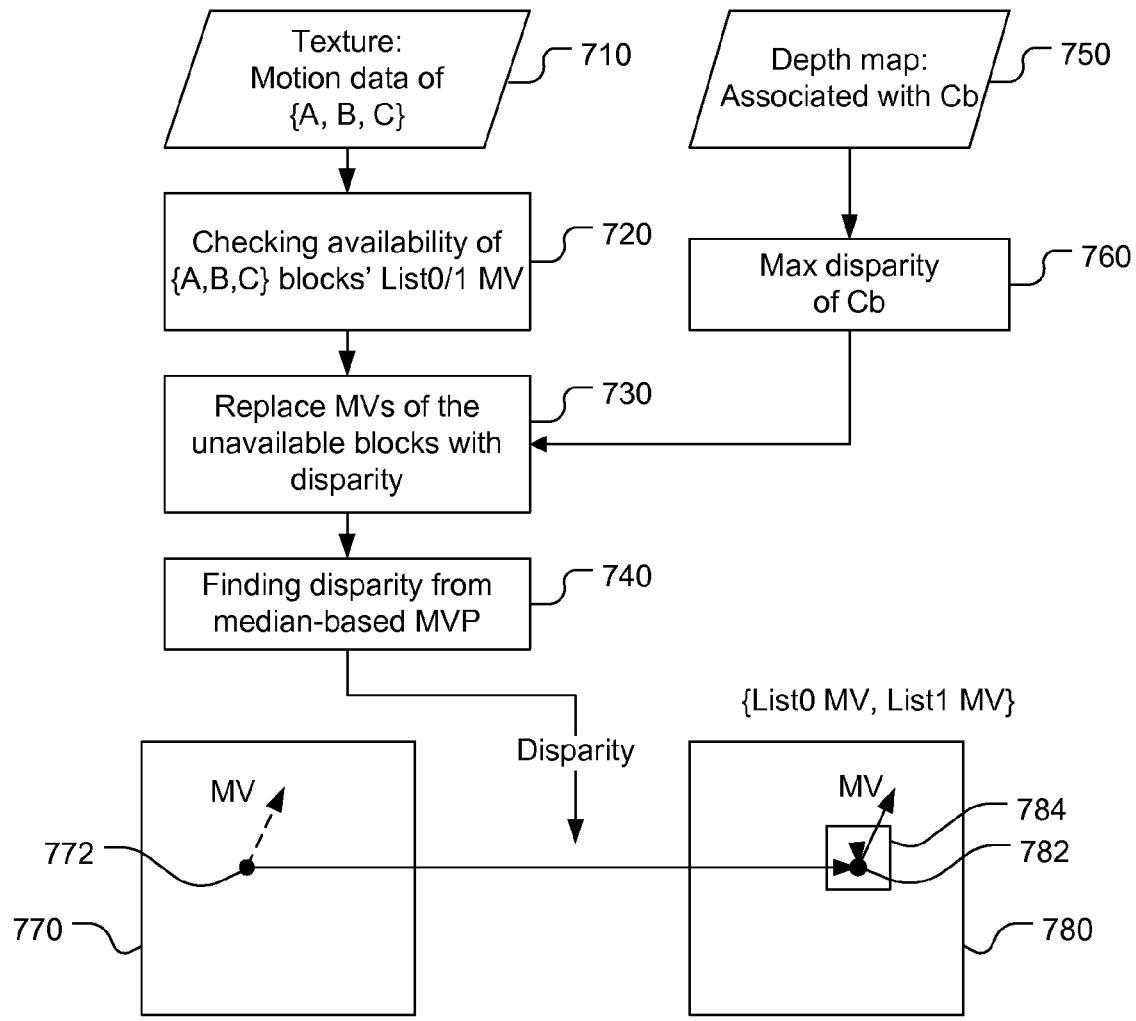
FIG. 7 illustrates an exemplary derivation procedure of unified disparity vector (DV) for inter-view MVP candidate according to an embodiment of the present invention.

A flowchart for a 3D video coding system incorporating unified list0 and list1 DV derivation according to an embodiment of the present invention is illustrated in FIG. 7. The input data to the unified list0 and list1 DV derivation process comprises motion data (710) associated with neighboring blocks A, B and C of the texture picture in a dependent view and depth data of the current block (750) in the dependent view. The availability of list0 DVs and list1 DVs associated with neighboring blocks are checked in step 720. If both the list 0DVs and list 1 DVs for a neighboring block are not available, the DV is replaced by a disparity vector (DV) converted from the depth data associated with the current block as shown in step 730. The disparity data for replacing an unavailable DV may correspond to the maximum disparity of four corner depth values associated with the current block (760). The final disparity may be determined based on the median of the DVs as shown in step 740. After the disparity vector is derived for the current block (770), a block (784) covering the corresponding point (782) in the corresponding block (780) of the reference view can be identified. Position 772 of the current block corresponds to a central position. The motion vectors (List0 MV, List1 MV) associated with block 784 can be used as an inter-view MVP candidate.

The DV derivation can be from the DVs of neighboring blocks according to a search order. The search order may be pre-defined and some exemplary search orders are shown as follow (L0 is list0 and L1 is list1):

a. L0 DV of A→L0 DV of B→L0 DV of C
b. L1 DV of A→L1 DV of B→L1 DV of C
c. L0 DV of A→L0 DV of B→L0 DV of C→L1 DV of A→L1 DV of B→L1 DV of C
d. L0 DV of A→L1 DV of A→L0 DV of B→L1 DV of B→L0 DV of C→L1 DV of C
e. L0 DV of A→L0 DV of B→L0 DV of C→converted from depth
f. L1 DV of A→L1 DV of B→L1 DV of C→converted from depth
g. L0 DV of A→L0 DV of B→L0 DV of C→L1 DV of A→L1 DV of B→L1 DV of C→converted from depth
h. L0 DV of A→L1 DV of A→L0 DV of B→L1 DV of B→L0 DV of C→L1 DV of C→converted from depth In each of the search orders listed above, the availability of the DV associated with a neighboring block is checked. In the example of search order a, L0 DV of A (i.e., the DV of block A pointing to a reference picture in list0) is searched first, followed by L0 DV of B (i.e., the DV of block B pointing to a reference picture in list0), and followed by L0 DV of C (i.e., the DV of block C pointing to a reference picture in list0). In the example of search order e, L0 DVs of blocks A, B and C are searched according to the order of A, B and C. If none the neighboring blocks has an available DV, the DV is converted from the depth information associated with the current block. After all the DVs of the neighboring blocks are derived, a median filter is applied to the DVs to select the final DV. The final DV is then used to locate a corresponding block in the reference picture. The inter-view MVP candidate is derived from the MVs of the corresponding block. During the unified DV derivation procedure, the search can be terminated once a valid DV is found.

One aspect of the present invention address the issue when no DV is available or no desired DV is available during the DV derivation for priority-based MVP candidate derivation. Some exemplary procedures are disclosed as follow for the case of no available DV or no desired DV. In the first example, the DV derivation is inferred from neighboring blocks using the search orders as shown above. If no valid DV is available (e.g., no DV pointing to a target inter-view reference picture, or no depth available or allowed), a zero disparity vector is used or the inter-view MVP candidate is set as not available. In the second example, during the DV derivation by inferring DVs of neighboring blocks according to the search orders as shown above, the MV of the corresponding block located by the DV is checked. If the inferred DV is Intra-coded or is not available, the search procedure will continue based on the next block in the search order. If no valid DV (DV pointing to the target inter-view picture) is available, a zero disparity vector is used or the inter-view MVP candidate is set as not available. In the third example, during the DV derivation by inferring DVs of neighboring blocks according to the search orders as shown above, the MV of the corresponding block located by the DV is checked. If the corresponding block is Intra-coded or the MV is not available, the search procedure will infer another DV from a neighboring block or derived from a depth block and continue the search. If the new corresponding block is also Intra-coded or the MV is unavailable, the process will continue until a first available inter-view MVP candidate is found.

In another embodiment of the present invention, the list0 MV and list1 MV of the inter-view MVP candidate are derived independently. The initial list0 MV and list1 MV of the inter-view MVP candidate can be derived using the search orders mentioned above or using a conventional procedure such as the procedure described in 3DV-ATM-5.0. If the initial DV is not available and only neighboring blocks can be used to derive the DV (i.e., no depth information associated with the current block allowed), the inter-view MVP candidate is set as unavailable. When the initial DV is unavailable, if the DV is allowed to derive from depth map and depth map is available, the DV converted from depth map is used as the derived DV. The derived DV is then used to locate the corresponding block in the inter-view reference picture and the MV in the same list of the corresponding block is used as the inter-view MVP candidate. If the corresponding block is Intra-coded or not available, the inter-view MVP candidate is set as unavailable. Otherwise, for each list MV, the MV of the corresponding block in the same list is used as the inter-view MVP candidate. According to another embodiment, for each list, if the inter-view candidate is not available, the other spatial MVP candidate will be used as the final MVP for that list.

Another aspect of the present invention addresses the MV derivation procedure of spatial MVP candidate. In order to overcome the issue described above, an embodiment of the present invention restricts the target reference index to zero for both Skip and Direct mode. Therefore, the target reference index for both Skip and Direct modes is zero. In another embodiment according to the present invention, the target reference indexes for Direct and Skip modes are unified. For example, the target reference index can be set to zero for both Direct and Skip modes. In yet another embodiment according to the present invention, the target reference index for Direct and/or Skip mode is set to the majority of the target reference indexes of the spatial neighboring blocks in Direct and/or Skip mode. In yet another embodiment according to the present invention, if the target reference index points to a temporal reference picture, the derivation procedure of the spatial MVP candidates first checks for each neighboring block whether the neighboring block has an MV pointing to the target reference index, or whether the corresponding block of current block or the corresponding block of the neighboring block in the reference view has any MV pointing to the target reference index. If none of the neighboring block and the corresponding blocks associated with the current block and the neighboring block has any MV pointing to the target reference index, a zero MV is used to represent the MV of the neighboring block. In yet another embodiment according to the present invention, if the target reference index points to a temporal reference picture, the derivation procedure of the spatial (MVP) candidates first checks for each neighboring block whether the neighboring block has any MV pointing to the target reference index or whether the corresponding block of the neighboring block in the reference view has any MV pointing to the target reference index. If neither the neighboring block nor the corresponding block of the neighboring block in the reference view has any MV pointing to the target reference index, a zero MV is used to represent the MV of the neighboring block.

Figure 8:
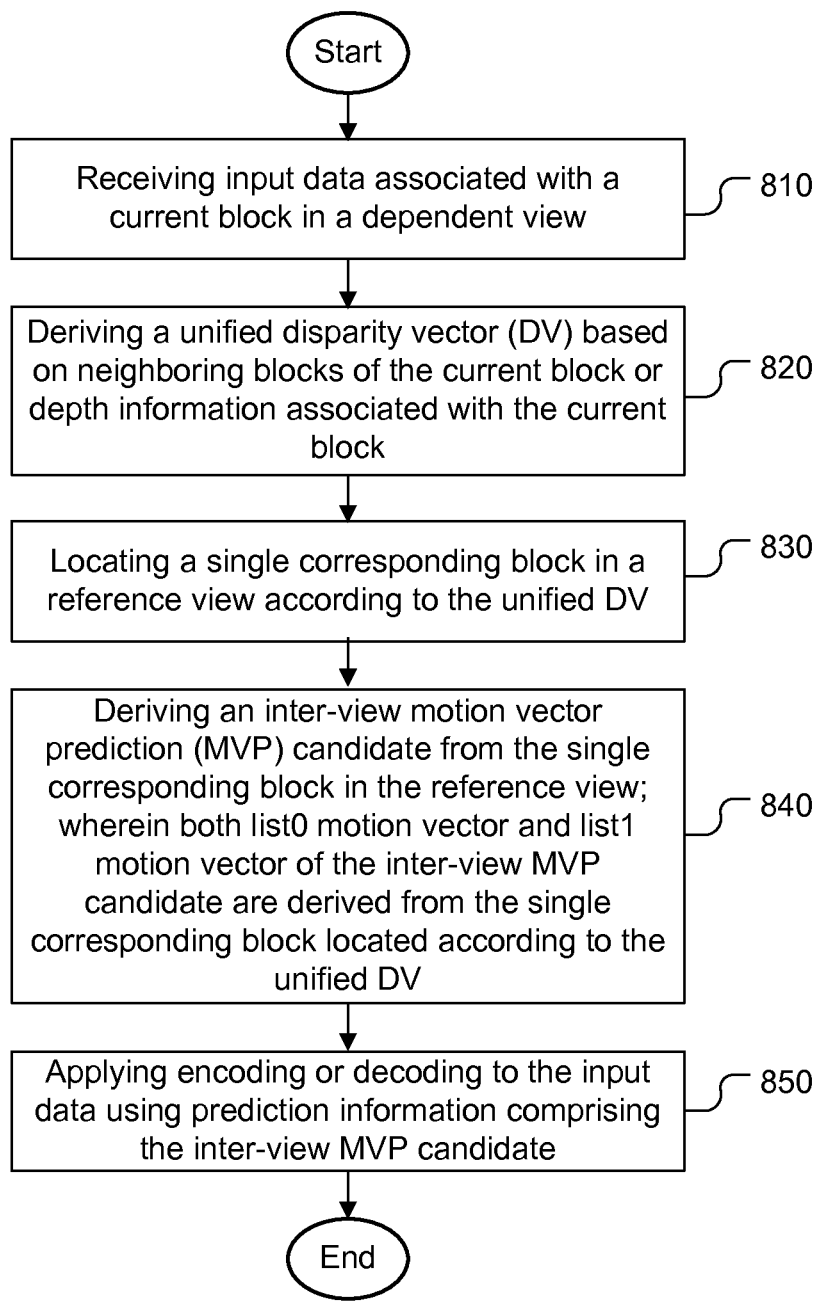
FIG. 8 illustrates an exemplary flowchart of a three-dimensional encoding or decoding system incorporating a unified disparity vector based on neighboring blocks according to an embodiment of the present invention.

FIG. 8 illustrates an exemplary flowchart of a three-dimensional encoding or decoding system incorporating a unified disparity vector based on neighboring blocks according to an embodiment of the present invention. The system receives input data associated with a current block in a dependent view as shown in step 810. For encoding, the input data associated with the current block corresponds to original pixel data, depth data, or other information associated with the current block (e.g., motion vector, disparity vector, motion vector difference, or disparity vector difference) to be coded. For decoding, the input data corresponds to the coded data associated with the current block in the dependent view. The input data may be retrieved from storage such as a computer memory, buffer (RAM or DRAM) or other media. The input data may also be received from a processor such as a controller, a central processing unit, a digital signal processor or electronic circuits that produce the input data. A unified disparity vector (DV) is derived based on neighboring blocks of the current block or depth information associated with the current block as shown in step 820. A single corresponding block in a reference view is located according to the unified DV as shown in step 830. An inter-view motion vector prediction (MVP) candidate is then derived for both list0 and list1 from the single corresponding block in the reference view as shown in step 840. Both list0 motion vector and list1 motion vector of the inter-view MVP candidate are derived from the single corresponding block located according to the unified DV. After the inter-view MVP candidate is derived, encoding or decoding is applied to the input data using prediction information comprising the inter-view MVP candidate as shown in step 850.

The flowcharts shown above are intended to illustrate examples of inter-view prediction using the disparity vector. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional video coding and multi-view video coding, wherein reference pictures comprises reference pictures in a reference picture list 0 and reference pictures in a reference picture list 1, wherein the reference picture list 0 and the reference picture list 1 are associated with different prediction directions, the method comprising:

receiving input data associated with a current block in a dependent view, wherein the input data received at a video encoder side at least corresponds to one or more: of original pixel data or depth data associated with the current block, and wherein the input data received at a video decoder side comprises a video bitstream corresponding to compressed data including the current block;

deriving a unified disparity vector (DV) based on at least one of:

disparity vectors (DVs) of neighboring blocks, according to a search order associated with the neighboring blocks;

disparity vector (DV) derived from depth information associated with the current block; or a linear combination or a statistic of selected DVs for the neighboring blocks, wherein the selected DVs are derived by checking available list0 DVs or available list1 DVs of the neighboring blocks;

locating a single corresponding block in a reference view according to the unified DV by pointing from a position of the current block to a position in the reference view through the unified DV to locate the single corresponding block;

deriving both list0 motion vector and list1 motion vector of an inter-view motion vector prediction (MVP) candidate from the single corresponding block in the reference view; and encoding the input data using prediction information comprising the inter-view MVP candidate or decoding the input data using the prediction information comprising the inter-view MVP candidate.

2. The method of claim 1, wherein the neighboring blocks comprise a left block, an upper block and an upper-right block, and wherein the upper-right block is replaced by an upper-left block if the DV associated with the upper-right block is unavailable.

3. The method of claim 2, wherein the unified DV is derived from the DVs of the neighboring blocks according to a search order, and wherein the search order corresponds to searching the left block first, followed by the upper block, and then followed by the upper-right block.

4. The method of claim 1, wherein the unified DV is derived from the DVs of the neighboring blocks according to a search order.

5. The method of claim 1, wherein the unified DV is derived from the DVs of the neighboring blocks associated with list0 and list1.

6. The method of claim 5, wherein the DV of each neighboring block in one list is checked to find an available DV; if no DV is available in said one list, the DV of said each neighboring block in another list is checked to find the available DV; the available DV is designated as a selected DV of said each neighboring block; and wherein said one list is selected from a group consisting of list0 and list1.

7. The method of claim 6, wherein if no available DV is found for said each neighboring block after checking the DV of said each neighboring block in both list0 and list1, a zero DV or a converted DV is used as the selected DV for said each neighboring block, wherein the converted DV is converted from one or more depth values, one or more neighboring texture or depth blocks of said each neighboring block.

8. The method of claim 5, wherein the unified DV is derived by first checking the DVs of the neighboring blocks in one list to find an available DV; if no DV is available, the unified DV is derived by checking the DVs of the neighboring blocks in another list to find the available DV; and wherein said one list is selected from a group consisting of list0 and list1.

9. The method of claim 8, wherein said checking the DVs of the neighboring blocks is terminated whenever one available DV is found.

10. The method of claim 8, wherein the DV of one neighboring block is counted as unavailable if the DV does not exist, or the corresponding block located by the DV of said one neighboring block is intra-coded or not available.

11. The method of claim 8, wherein if no available DV is found after checking the DVs of the neighboring blocks in both list0 and list1, a zero DV or a converted DV is used as the unified DV, wherein the converted DV is converted from one or more depth values associated with the current block.

12. The method of claim 1, wherein the unified DV is derived by converting one or more depth values associated with the current block.

13. The method of claim 12, wherein the unified DV is derived by converting the depth values from four corners associated with the current block.

14. An apparatus for three-dimensional video coding and multi-view video coding, wherein reference pictures comprises reference pictures in a reference picture list 0 and reference pictures in a reference picture list 1, wherein the reference picture list 0 and the reference picture list 1 are associated with different prediction directions, the apparatus comprising one or more electronic circuits and wherein said one or more electronic circuits are configured to:

receive input data associated with a current block in a dependent view, wherein the input data received at a video encoder side at least corresponds to one or more: of original pixel data or depth data associated with the current block, and wherein the input data received at a video decoder side comprises a video bitstream corresponding to compressed data including the current block;

derive a unified disparity vector (DV) based on at least one of:

disparity vectors (DVs) of neighboring blocks, according to a search order associated with the neighboring blocks;

disparity vector (DV) derived from depth information associated with the current block; or a linear combination or a statistic of selected DVs for the neighboring blocks, wherein the selected DVs are derived by checking available list0 DVs or available list1 DVs of the neighboring blocks;

locate a single corresponding block in a reference view according to the unified DV by pointing from a position of the current block to a position in the reference view through the unified DV to locate the single corresponding block;

derive both list0 motion vector and list1 motion vector of an inter-view motion vector prediction (MVP) candidate from the single corresponding block in the reference view; and encode the input data using prediction information comprising the inter-view MVP candidate or decode the input data using the prediction information comprising the inter-view MVP candidate.

* * * * *